(12) United States Patent
MacAdam

(10) Patent No.: US 9,303,867 B2
(45) Date of Patent: Apr. 5, 2016

(54) DUAL-PRESSURE FIXED BED CHEMICAL LOOPING PROCESS FOR ENHANCED OIL RECOVERY

(71) Applicant: CONOCOPHILLIPS COMPANY, Houston, TX (US)

(72) Inventor: Scott MacAdam, Calgary (CA)

(73) Assignee: ConocoPhillips Company, Houston, TX (US)

( * ) Notice: Subject to any disclaimer, the term of this patent is extended or adjusted under 35 U.S.C. 154(b) by 392 days.

(21) Appl. No.: 13/942,269

(22) Filed: Jul. 15, 2013

(65) Prior Publication Data

US 2014/0017618 A1    Jan. 16, 2014

Related U.S. Application Data

(60) Provisional application No. 61/672,136, filed on Jul. 16, 2012.

(51) Int. Cl.
*F23C 10/00* (2006.01)
*F23C 13/04* (2006.01)
*F23C 99/00* (2006.01)

(52) U.S. Cl.
CPC ............. *F23C 13/04* (2013.01); *F23C 10/005* (2013.01); *F23C 99/00* (2013.01); *F23C 2900/99008* (2013.01); *Y02C 10/08* (2013.01); *Y02E 20/346* (2013.01)

(58) Field of Classification Search
CPC ......... F23C 13/04; F23C 10/005; F23C 10/00
USPC ............. 431/7, 170, 2, 3; 422/608, 618, 402; 423/677, 659
See application file for complete search history.

(56) References Cited

U.S. PATENT DOCUMENTS

| 2003/0138747 A1 | 7/2003 | Zeng et al. | |
|---|---|---|---|
| 2005/0223891 A1 | 10/2005 | Zeng et al. | |
| 2010/0314136 A1* | 12/2010 | Zubrin | E21B 43/164 166/402 |
| 2011/0014088 A1 | 1/2011 | Zubrin et al. | |

(Continued)

FOREIGN PATENT DOCUMENTS

| EP | 2515038 A1 * | 10/2012 | ............ F23C 10/005 |
|---|---|---|---|
| EP | 2623182 A1 * | 8/2013 | ............... F23J 15/02 |

OTHER PUBLICATIONS

Kimball, et al. "Fixed-bed Chemical Looping Combustion: Experiment-based conceptual design" TNO, the Netherlands, Clearwater Coal Conference, Clearwater, Fl., Jun. 6-10, 2010.

*Primary Examiner* — Gregory Huson
*Assistant Examiner* — Nikhil Mashruwala
(74) *Attorney, Agent, or Firm* — ConocoPhillips Company

(57) ABSTRACT

Methods and systems are provided for enhancing heavy oil recovery using fixed-bed chemical looping combustion processes that incorporate carbon dioxide capture and/or sequestration. A fixed-bed chemical looping combustion process is provided for generating heat and carbon dioxide. The heat thus generated may be employed in thermal recovery techniques such as SAGD to enhance recovery of heavy oils. Additionally or alternatively, the carbon dioxide produced by the process may be sequestered, captured, employed as a tertiary recovery technique, or any combination thereof. Advantages of certain embodiments include one or more of the following advantages: lower cost, relatively high conversion rates, and high theoretical efficiency of carbon dioxide capture.

14 Claims, 1 Drawing Sheet

(56) References Cited

U.S. PATENT DOCUMENTS

| | | | |
|---|---|---|---|
| 2011/0198861 A1* | 8/2011 | Jallais | F23C 10/01 290/1 R |
| 2014/0154634 A1* | 6/2014 | Niass | C01B 13/0248 431/7 |
| 2015/0013575 A1* | 1/2015 | Yazdanpanah | C10J 3/482 110/229 |

* cited by examiner

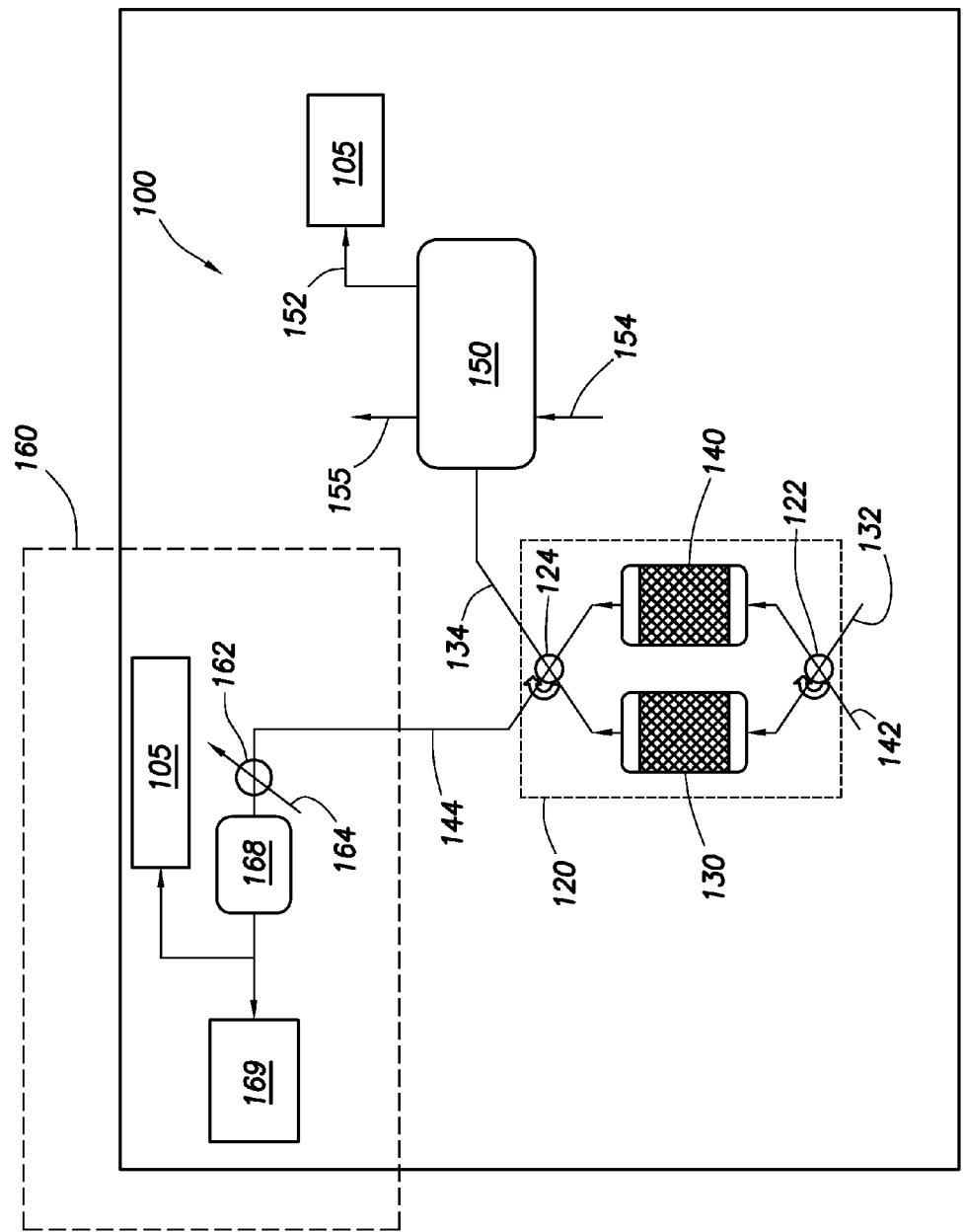

DUAL-PRESSURE FIXED BED CHEMICAL LOOPING PROCESS FOR ENHANCED OIL RECOVERY

CROSS-REFERENCE TO RELATED APPLICATIONS

This application is a non-provisional application which claims benefit under 35 USC §119(e) to U.S. Provisional Application Ser. No. 61/672,136, filed Jul. 16, 2012, entitled "Dual-Pressure Fixed Bed Chemical Looping Process for Enhanced Heavy Oil Recovery," which is incorporated herein in its entirety.

STATEMENT REGARDING FEDERALLY SPONSORED RESEARCH

None.

FIELD OF THE INVENTION

The present invention relates generally to methods and systems for enhanced heavy oil recovery using fixed-bed chemical looping combustion processes that incorporate carbon dioxide capture and/or sequestration.

BACKGROUND

The production of high viscosity hydrocarbons presents significant challenges. Extraction of high viscosity hydrocarbons is typically difficult due to the relative immobility of the high viscosity hydrocarbons. For example, some heavy crude oils, such as bitumen, are highly viscous and therefore immobile at the initial viscosity of the heavy oil at reservoir temperature and pressure. Indeed, such heavy oils may be quite thick and have a consistency similar to that of peanut butter or heavy tars, making their extraction from reservoirs especially challenging.

Conventional approaches to recovering such heavy oils often focus on methods for lowering the viscosity of the heavy oil such as by heating the reservoir so that the heavy oil may be more easily produced from the reservoir. Commonly used thermal recovery techniques include a number of reservoir heating methods, such as steam flooding, cyclic steam stimulation, and Steam Assisted Gravity Drainage (SAGD).

To generate the heat required by conventional thermal technologies, these conventional methods typically use combustion devices to produce the required heat. Unfortunately, these combustion devices produce substantial amounts of greenhouse gases, which are often vented to atmosphere. The accumulation of greenhouse gases such as carbon dioxide in the atmosphere is known to contribute to acid rain, ocean acidification, and global warming due to the greenhouse effect. Additionally, existing and proposed regulations encourage the reduction of carbon emissions or the carbon dioxide capture. Thus, capturing carbon dioxide remains a continuing interest due to environmental and regulatory concerns.

While technologies exist and are being further developed to capture or sequester carbon dioxide, these technologies are inefficient and often uneconomical. Examples of carbon dioxide capture processes include chemical absorption methods and carbon dioxide scrubbing processes. Capturing carbon dioxide from flue gas of traditional boilers often requires complex separation equipment to separate the carbon dioxide from the flue gas. Moreover, flue gas is typically produced at near atmospheric pressure, requiring expensive compression equipment to compress the carbon dioxide sufficiently so that it may be introduced into the appropriate capture or sequestration process. Flue gas from traditional boilers contains significant amounts of nitrogen. This presence of a significant amount of nitrogen in the flue gas dramatically increases the capital and operating costs of treating the flue gas due to the need for compressing the sheer quantity of nitrogen present in the flue gas.

Where air is used as the oxidant to the direct steam generator, the exhaust gas will necessarily contain significant amounts of nitrogen. In addition to the presence of nitrogen in the flue gas, direct steam generators also necessarily combine steam with the flue gas. Where it is desired to use the steam thus generated for enhancement of heavy oil recovery, the inability to feasibly separate the exhaust gas from the steam is particularly problematic with this nitrogen-laden steam where reservoirs are negatively impacted by nitrogen. Therefore, using steam produced by direct steam generators may be disadvantageous where it is desired to inject steam into a subterranean formation without one or more components of the exhaust gas such as nitrogen. Additionally, direct steam generators do not offer the ability to control or limit the amount of carbon dioxide that is combined Thus, traditional combustion technologies suffer from one or more disadvantages including low pressure output which complicates carbon dioxide capture or sequestration, and in some cases, the failure to economically separate carbon dioxide from nitrogen and other components in the flue gas for efficient carbon dioxide capture. Additionally, in the case of direct steam generators, the failure to adequately segregate carbon dioxide from the output of traditional combustion technologies results in an inability to control or limit the amount of carbon dioxide introduced with steam to a subterranean formation. Often, it may be desired to use some amount of carbon dioxide as a tertiary recovery solvent to enhance heavy oil recovery, but the carbon dioxide is often inextricably mixed with large amounts of nitrogen which may negatively impact heavy oil recovery. Thus, operators are prevented from using such carbon dioxide streams to enhance heavy oil recovery due to nitrogen contamination.

While separation processes exist to recover carbon dioxide from flue gas or from the output of direct steam generators, these conventional technologies, such as cryogenic separation plants, are inefficient and suffer from high capital and operating costs. Moreover, such conventional technologies typically employ noxious or environmentally unfriendly solvents.

One alternative to traditional boilers to avoid problems posed by large amounts of nitrogen in the flue gas is to use an oxy-fired boiler. Oxy-fired boilers use oxygen in lieu of air as the source of oxidation. Hence, the combustion product of an oxy-fired boiler is devoid of nitrogen. Accordingly, the combusted fuel mainly comprises carbon dioxide and steam and is therefore much more easily processed to capture or sequester the carbon dioxide. Unfortunately, oxy-fired boilers require oxygen as the oxidation source which is not only costly but also demands significant upfront treatment to separate oxygen from air, typically using inefficient and costly cryogenic air separation processes.

For all of these reasons, traditional combustion technologies are not conducive to efficient carbon dioxide capture and sequestration. Accordingly, conventional thermal recovery techniques, such as SAGD, suffer from poor carbon dioxide footprints. That is, conventional thermal recovery techniques are poorly designed for subsequent carbon dioxide capture or sequestration. Indeed, in some cases, these thermal recovery techniques are so inefficient that they are often not economically viable for recovering heavy crude oil.

Accordingly, there is a need for enhanced heavy oil recovery methods that address one or more of the disadvantages of the prior art.

SUMMARY

The present invention relates generally to methods and systems for enhanced heavy oil recovery using fixed-bed chemical looping combustion processes that incorporate carbon dioxide capture and/or sequestration.

One example of a fixed-bed chemical looping combustion process for generating heat and carbon dioxide for enhanced oil recovery from a subterranean formation comprises the steps of: (a) providing a plurality of reactors, wherein each of the plurality of reactors comprises an oxygen carrier agent in a fixed bed, wherein the plurality of reactors comprise a first reactor and a second reactor, wherein the oxygen carrier agent of the first reactor is substantially depleted of oxygen, wherein the oxygen carrier agent of the second reactor is substantially enriched in oxygen; (b) introducing a gas mixture to the first reactor, wherein the gas mixture comprises oxygen; (c) allowing the oxygen carrier agent of the first reactor to oxidize and preferentially retain oxygen from the gas mixture to form an oxygen-depleted gas mixture; (d) allowing the oxygen-depleted gas mixture to exit the first reactor; (e) introducing the oxygen-depleted gas mixture to a heat recovery device; (f) introducing a hydrocarbon fuel to the second reactor; (g) allowing the hydrocarbon fuel to be oxidized by oxygen from the oxygen carrier agent of the second reactor to form a combusted output stream, wherein the combusted output stream comprises carbon dioxide and steam; (h) allowing the combusted output stream to exit the second reactor; (i) separating the steam from the combusted output stream to form a substantially dry combusted output stream; (j) allowing the oxygen carrier agent of the first reactor to become enriched with oxygen while allowing the oxygen carrier agent of the second reactor to become depleted with oxygen; (k) repeating steps (b)-(j) with the first reactor substituted in place of the second reactor and the second reactor substituted in place of the first reactor; (l) repeating steps (b)-(j); and (m) repeating steps (k) and (l) a plurality of times.

One example of a fixed-bed chemical looping combustion process for generating heat and carbon dioxide for enhanced oil recovery from a subterranean formation comprises the steps of: (a) providing a plurality of reactors, wherein each of the plurality of reactors comprises an oxygen carrier agent in a fixed bed, wherein the plurality of reactors comprise a first reactor and a second reactor, wherein the oxygen carrier agent of the first reactor is substantially depleted of oxygen, wherein the oxygen carrier agent of the second reactor is substantially enriched in oxygen; (b) introducing a gas mixture to the first reactor, wherein the gas mixture comprises oxygen; (c) allowing the oxygen carrier agent of the first reactor to oxidize and preferentially retain oxygen from the gas mixture to form an oxygen-depleted gas mixture; (d) allowing the oxygen-depleted gas mixture to exit the first reactor; (e) introducing the oxygen-depleted gas mixture to a heat recovery device; (f) introducing a hydrocarbon fuel to the second reactor; (g) allowing the hydrocarbon fuel to be oxidized by oxygen from the oxygen carrier agent of the second reactor to form a combusted output stream, wherein the combusted output stream comprises carbon dioxide and steam; (h) allowing the combusted output stream to exit the second reactor; (i) separating the steam from the combusted output stream to form a substantially dry combusted output stream; (j) allowing the oxygen carrier agent of the first reactor to become enriched with oxygen while allowing the oxygen carrier agent of the second reactor to become depleted with oxygen; (k) ceasing the gas mixture to the first reactor and ceasing the hydrocarbon fuel to the second reactor; (l) introducing the gas mixture to the second reactor; (m) allowing the oxygen carrier agent of the second reactor to oxidize and preferentially retain oxygen from the gas mixture to form an oxygen-depleted gas mixture; (n) allowing the oxygen-depleted gas mixture to exit the second reactor; (o) introducing the oxygen-depleted gas mixture to the heat recovery device; (p) introducing the hydrocarbon fuel to the first reactor; (q) allowing the hydrocarbon fuel to be oxidized by oxygen from the oxygen carrier agent of the first reactor to form the combusted output stream; (r) allowing the combusted output stream to exit the first reactor; (s) separating the steam from the combusted output stream to form the substantially dry combusted output stream.

One example of a fixed-bed chemical looping combustion process for generating heat and carbon dioxide for enhanced oil recovery from a subterranean formation comprises the steps of: (a) providing a plurality of reactors, wherein each of the plurality of reactors comprises an oxygen carrier agent in a fixed bed, wherein the plurality of reactors comprise a first reactor and a second reactor, wherein the oxygen carrier agent of the first reactor is substantially depleted of oxygen, wherein the oxygen carrier agent of the second reactor is substantially enriched in oxygen; (b) introducing a gas mixture to the first reactor, wherein the gas mixture comprises oxygen; (c) allowing the oxygen carrier agent of the first reactor to oxidize and preferentially retain oxygen from the gas mixture to form an oxygen-depleted gas mixture; (d) allowing the oxygen-depleted gas mixture to exit the first reactor; (e) introducing the oxygen-depleted gas mixture to a heat recovery device; (f) introducing a hydrocarbon fuel to the second reactor; (g) allowing the hydrocarbon fuel to be oxidized by oxygen from the oxygen carrier agent of the second reactor to form a combusted output stream, wherein the combusted output stream comprises carbon dioxide and steam; (h) allowing the combusted output stream to exit the second reactor; (i) separating the steam from the combusted output stream to form a substantially dry combusted output stream; (j) allowing the oxygen carrier agent of the first reactor to become enriched with oxygen while allowing the oxygen carrier agent of the second reactor to become depleted with oxygen; (k) repeating steps (b)-(j) with the first reactor substituted in place of the second reactor and the second reactor substituted in place of the first reactor; (l) repeating steps (b)-(j); and (m) repeating steps (k) and (l) a plurality of times; wherein the first reactor is operated at a pressure above at least about 700 psi when the first reactor is used to oxidize the hydrocarbon fuel and wherein the second reactor is operated at a pressure above at least about 700 psi when the second reactor is used to oxidize the hydrocarbon fuel.

The features and advantages of the present invention will be apparent to those skilled in the art. While numerous changes may be made by those skilled in the art, such changes are within the spirit of the invention.

BRIEF DESCRIPTION OF THE DRAWINGS

A more complete understanding of the present disclosure and advantages thereof may be acquired by referring to the following description taken in conjunction with the accompanying figures, wherein:

FIG. 1 illustrates an example of an enhanced heavy oil recovery system using a fixed-bed chemical looping combustion process in accordance with one embodiment of the present invention.

While the present invention is susceptible to various modifications and alternative forms, specific exemplary embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

The present invention relates generally to methods and systems for enhanced heavy oil recovery using fixed-bed chemical looping combustion processes that incorporate carbon dioxide capture and/or sequestration.

In certain embodiments, methods and systems for enhancing recovery of heavy oils include using a fixed-bed chemical looping combustion process for generating heat and carbon dioxide. The heat thus generated may be employed in thermal recovery techniques such as SAGD to enhance recovery of heavy oils. Additionally or alternatively, the carbon dioxide produced by the process may be sequestered, captured, employed as a tertiary recovery technique, or any combination thereof.

In one embodiment, a fixed-bed chemical looping combustion process employs a reactor with an oxygen carrier agent in a fixed bed. A gas mixture comprising oxygen (e.g. air) is introduced to the reactor. The oxygen from the air oxidizes the oxygen carrier agent, which thus depletes the air of oxygen, producing an oxygen-depleted gas mixture (e.g. comprising mostly nitrogen where the gas mixture happens to be air). Because this reaction is exothermic, the oxygen-depleted gas mixture is heated and may be used as a heat source to generate steam and/or power if desired.

After sufficient oxidation of the oxygen carrier agent, a hydrocarbon fuel may be introduced to the reactor to oxidize or combust the hydrocarbon fuel using the oxygen from the oxidized oxygen carrier agent. In this way, the hydrocarbon fuel is oxidized to produce a combusted output stream comprising steam and carbon dioxide. Additionally, the combusted output stream thus produced is advantageously devoid of any nitrogen, unlike traditional combustion technologies. The combusted output stream is then available for enhancing recovery of heavy oils as will be described in further detail below.

As the oxidation of the hydrocarbon fuel progresses, the oxygen carrier agent is reduced to its original oxygen-depleted state over time. Multiple reactors may be employed to convert this otherwise batch process into a continuous process by conducting the carrier agent oxidation reaction in one or more reactors while the corresponding carrier agent reduction reaction is carried out in one or more other reactors. The reactors may then be alternately switched as desired as the oxygen carrier agent of each reactor is sufficiently oxidized or reduced.

Additionally, if desired, the combined steam/carbon dioxide stream may be relatively easily separated by condensing the steam, resulting in a relatively pure carbon dioxide stream that is then available for capture, for sequestration, or for tertiary recovery solvent to enhance heavy oil recovery.

The fixed-bed chemical looping processes as described herein, when combined with heavy oil recovery, have a number of advantages over conventional technologies. Where the hydrocarbon fuel is introduced to the reactor at high pressure, the combusted output stream (e.g. steam and carbon dioxide) is also produced at high pressure. This high pressure combusted output stream eliminates the need for expensive compressors to compress the combusted output stream for downstream applications. The steam and a portion or all of the carbon dioxide thus produced may be employed to enhance heavy oil recovery. Moreover, the high-pressure and nitrogen-free nature of the combusted output stream significantly reduces the capital costs as compared to conventional technologies in at least two ways. First, the high pressure of the stream eliminates the need, in some embodiments, for costly compressor equipment that would otherwise be needed to compress the stream for downstream applications. Additionally, the nitrogen-free nature of the stream as compared to conventional technologies not only greatly reduces the volume of the stream that must be dealt with but also eliminates the need for costly separation technology to separate nitrogen from the carbon dioxide in those downstream applications where nitrogen is undesirable.

Another advantage of some embodiments of the methods described herein includes the ability to operate each of the reactors independently of one another at different pressures. Some conventional technologies use fluidized-bed technologies which necessarily interconnect multiple reactors to one another. The fixed-bed, multiple reactor design described herein, on the other hand, allows each reactor to be operated independently of one another, allowing some of the advantages described above, such as the ability to operate one reactor at a high pressure while maintaining the other reactor at a low pressure. For instance, the first reactor, in which air oxidizes the oxygen carrier agent, may be operated at atmospheric pressure to eliminate the need for air compressors and power recovery turbines, while the second reactor, in which a fuel reduces the oxygen carrier agent, may be operated at elevated pressure to produce a pressurized outlet stream. This dual pressure operating feature reduces the need for expensive compressors and turbines.

Other advantages include lower costs, a relatively high conversion rates, and a high theoretical efficiency of carbon dioxide capture. Other features, embodiments, and advantages will be apparent from the disclosure herein.

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations that come within the scope of the invention.

FIG. 1 illustrates an example of an enhanced heavy oil recovery system using a fixed-bed chemical looping combustion process in accordance with one embodiment of the present invention. In this example, enhanced heavy oil recovery system 100 comprises dual-pressure fixed-bed chemical looping process ("DP FB-CLP") 120, heat recovery device 150, and carbon dioxide capture/sequestration system 160.

In general, DP FB-CLP 120 combusts hydrocarbon fuel 142 to produce steam and carbon dioxide, one or both of which may be used to enhance heavy oil recovery as will be explained further below. DP FB-CLP 120 also produces oxygen-depleted gas mixture 134 from an oxidant inlet stream such as air 132. Heat recovery device 150 recovers heat from oxygen-depleted gas mixture 134 as described in more detail below. In this way, enhanced heavy oil recovery system 100 produces both heat and carbon dioxide, both of which may be leveraged to enhance heavy oil recovery.

DP FB-CLP 120 comprises first reactor 130 and second reactor 140. Both reactors contain a fixed-bed of oxygen carrier agent (i.e 131 and 141). The oxygen carrier agent is any metal or metal oxide that oxidizes upon exposure to oxygen. Examples of suitable oxygen carrier agents include, but are not limited to, metal oxides, nickel/nickel oxide, copper/copper oxides, iron/iron oxides, manganese/manganese oxides, cobalt, cobalt oxides, and calcium sulfides, calcium sulfites, calcium sulfates, or any combination thereof.

In one embodiment, gas mixture 132 is introduced to first reactor 130. Gas mixture 132 is any gas mixture comprising oxygen. In certain embodiments, gas mixture 132 is air. Oxygen carrier agent 131 oxidizes in the presence of gas mixture 132 by depleting oxygen from gas mixture 132 to form oxygen-depleted gas mixture 134. In certain embodiments, oxygen carrier agent depletes all or nearly all of the oxygen from gas mixture 132. Where gas mixture 132 is air, oxygen-depleted gas mixture 134 may be mostly nitrogen by depleting oxygen from the air. Because the oxidation reaction is highly exothermic, oxygen-depleted gas mixture 134 is substantially heated. Oxygen-depleted gas mixture 134 is then introduced to heat recovery device 150 to recover heat from oxygen-depleted gas mixture 134. Heat recovery device is any device suitable for recovering heat from oxygen-depleted gas mixture 134, including, but not limited to, a fired boiler, a waste heat boiler, a boiler feedwater preheater, a recovery steam generator, or a heat exchanger. Where heat recovery device 150 is a boiler for producing steam, steam 152 thus produced may be introduced to downstream user 105 for use in enhancing recovery of heavy oils. Where heat recovery device 150 is a boiler feedwater preheater, heat recovery device 150 heats boiler feedwater 154 to form heated boiler feedwater 155. Examples of suitable downstream users 105 include, but are not limited to, secondary recovery in a subterranean formation, a SAGD process for reducing the viscosity of heavy oils in a subterranean formation, power generation, or any combination thereof. In this way, the exothermic heat of reaction in first reactor 130 is leveraged to benefit the recovery of heavy oils from a subterranean formation.

Returning to DP FB-CLP 120, second reactor 140 comprises oxygen carrier agent 141 which has been previously oxidized, for example, by the process described above relating to first reactor 130. Thus, oxygen carrier agent 141 is substantially in an oxidized state and is in a condition to oxidize hydrocarbon fuel 144. Upon introduction of hydrocarbon fuel 142 to second reactor 140, hydrocarbon fuel 142 is then oxidized by oxygen carrier agent 141 to form combusted output stream 144, which is then introduced to carbon dioxide capture/sequestration system 160. Hydrocarbon fuel may comprise any hydrocarbons capable of being oxidized including, but not limited to, natural gas, mixed fuel gas, syngas, or any combination thereof. Combusted output stream 144 comprises steam and carbon dioxide, the principal oxidation products of hydrocarbon fuel 142 and the oxidant from oxygen carrier agent 141. Where it is desired to use all of the steam and carbon dioxide of combusted output stream 144 for enhancing heavy oil recovery, combusted output stream 144 may be routed to downstream user 105 (e.g. in this case, a subterranean formation).

Where it is desired to remove all or a portion of the steam in combusted output stream 144, optional separator 162 (e.g. a condenser) may be used to condense the steam to form water 164 and dried combusted output stream 166. Optional carbon dioxide compression/purification system 168 may be used to further purify or compress dried combusted output stream 166 (or combusted output stream 144 where no optional separator 162 is employed) as desired before being routed to its final destination, either to downstream user 105 (e.g. in this case, a subterranean formation) or to pipeline 169 for capture, sequestration, or other downstream applications. In certain embodiments, hydrocarbon fuel 142 is introduced at a sufficiently high pressure to operate second reactor 140 at a high pressure (e.g. from about 150 psig to about 2,000 psig). This high pressure in turn produces combusted output stream 144 at a high pressure, which in certain embodiments, may reduce or even eliminate the need for further compression of combusted output stream 144 before being transported for end use in subterranean formation 105 or pipeline 169.

Upon sufficient reaction progress in first reactor 130 and second reactor 140, oxygen carrier agent 131 becomes sufficiently oxidized and oxygen carrier agent 141 becomes sufficiently reduced that the two reactors 130 and 140 may be swapped using inlet switching valve 122 and outlet switching valve 124. Thus, inlet switching valve may be used to divert gas mixture 132 to first reactor 140 and hydrocarbon fuel 142 to second reactor 130. In this way, first reactor 130 may now be used to oxidize hydrocarbon fuel 142 to form combusted output stream 144 while second reactor 140 may be used to reduce gas mixture 132 to form oxygen-depleted gas mixture 134. Accordingly, upon switching the function of the two reactors 130 and 140, oxygen carrier agent 131 in first reactor 130 may be reduced to its non-oxidized state while oxygen carrier agent 141 in second reactor 140 is oxidized by gas mixture 132.

Although DP FB-CLP 120 is depicted here with two reactors which are swapped batchwise with one another to provide a semi-continuous process, it is recognized that any number of reactors could so be incorporated into DP FB-CLP 120. For example, two reactors could be used for oxidizing an oxygen carrier bed while three reactors are used to oxidize hydrocarbon fuel. Additionally, one or more of the reactors could be purged with an inert gas before switching from gas mixture 132 to hydrocarbon fuel 142 or vice-versa if desired. Examples of suitable reactor run times before switching reactors include, but are not limited to, run times from about 15 to about 30 minutes, from about 5 hours to about 8 hours, or from about 15 minutes to about 8 hours.

In certain embodiments, oxygen carrier agent 131 and oxygen carrier agent 141 are supported in a fixed catalyst bed. The fixed catalyst bed avoids many of the disadvantages associated with conventional fluidized catalyst processes. In the fluidized catalyst processes, oxidized catalyst is pumped from one reactor to another where the catalyst can then be reduced again, as opposed to the process described herein where the catalyst remains static and the feeds are alternated between reactors to bring about the desired oxidation/reduction reactions. Unlike the fixed catalyst bed process, the fluidized catalyst processes necessarily prevents the reactors from operating at different pressures. Accordingly, unlike the process described herein, a fluidized catalyst process is unable to support one reactor at an elevated pressure while the other reactor is at a lower pressure. The fixed catalyst bed model described herein however allows the use of dual-pressure reactors which may be ideal because it reduces the need for compressors and turbines. Moreover, fluidized catalyst processes usually require gas-particle separation cyclones between the two reactors which can become excessively expensive with larger scales and can cause increased mechanical degradation of the fluidized catalyst particles. The small fines created by particle attrition can be quite damaging to downstream turbines and other equipment, making this a significant issue, especially for long term operation. The fixed catalyst bed process, on the other hand, avoids this type of catalyst degradation and attrition, leading to longer term catalyst life and reduced catalyst loss.

It is recognized that any of the elements and features of each of the devices described herein are capable of use with any of the other devices described herein without limitation. Furthermore, it is recognized that the steps of the methods herein may be performed in any order except unless explicitly stated otherwise or inherently required otherwise by the particular method.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations and equivalents are considered within the scope and spirit of the present invention. Also, the terms in the claims have their plain, ordinary meaning unless otherwise explicitly and clearly defined by the patentee.

What is claimed is:

1. A fixed-bed chemical looping combustion process for generating heat and carbon dioxide for enhanced oil recovery from a subterranean formation comprising the steps of:
    (a) providing a plurality of reactors, wherein each of the plurality of reactors comprises an oxygen carrier agent in a fixed bed, wherein the plurality of reactors comprise a first reactor and a second reactor, wherein the oxygen carrier agent of the first reactor is substantially depleted of oxygen, wherein the oxygen carrier agent of the second reactor is substantially enriched in oxygen;
    (b) introducing a gas mixture to the first reactor, wherein the gas mixture comprises oxygen;
    (c) allowing the oxygen carrier agent of the first reactor to oxidize and preferentially retain oxygen from the gas mixture to form an oxygen-depleted gas mixture;
    (d) allowing the oxygen-depleted gas mixture to exit the first reactor;
    (e) introducing the oxygen-depleted gas mixture to a heat recovery device;
    (f) introducing a hydrocarbon fuel to the second reactor;
    (g) allowing the hydrocarbon fuel to be oxidized by oxygen from the oxygen carrier agent of the second reactor to form a combusted output stream, wherein the combusted output stream comprises carbon dioxide and steam;
    (h) allowing the combusted output stream to exit the second reactor;
    (i) separating the steam from the combusted output stream to form a substantially dry combusted output stream;
    (j) allowing the oxygen carrier agent of the first reactor to become enriched with oxygen while allowing the oxygen carrier agent of the second reactor to become depleted with oxygen;
    (k) repeating steps (b)-(j) with the first reactor substituted in place of the second reactor and the second reactor substituted in place of the first reactor;
    (l) repeating steps (b)-(j);
    (m) repeating steps (k) and (l) a plurality of times; and
    wherein the first reactor is operated at a pressure above at least about 700 psi when the first reactor is used to oxidize the hydrocarbon fuel and wherein the second reactor is operated at a pressure above at least about 700 psi when the second reactor is used to oxidize the hydrocarbon fuel.

2. The method of claim 1 wherein the oxygen carrier agent comprises a metal that oxidizes upon exposure to oxygen.

3. The method of claim 1 wherein the oxygen carrier agent is a metal oxide, a nickel/nickel oxide, a copper/copper oxides, a iron/iron oxides, manganese/manganese oxides, a cobalt, a cobalt oxides, and a calcium sulfide, a calcium sulfite, a calcium sulfate, or any combination thereof.

4. The method of claim 1 wherein the gas mixture comprises air.

5. The method of claim 1 wherein the hydrocarbon fuel is natural gas, produced gas, mixed fuel gas, syngas, or any combination thereof.

6. The method of claim 1 wherein the heat recovery device is a fired boiler, a waste heat boiler, or a heat recovery steam generator, or any combination thereof to recover heat from the oxygen-depleted gas mixture.

7. The method of claim 6 wherein the heat recovery device is a heat exchanger and wherein claim 6 further comprises the step of preheating boiler feed water for a boiler.

8. The method of claim 1 further comprising the step of introducing the dry combusted output stream to the subterranean formation as a tertiary recovery gas.

9. The method of claim 1 further comprising the step of sequestering the dry combusted output stream.

10. The method of claim 1 wherein step (i) further comprises the step of condensing the steam from the combusted output stream using a condenser to form a substantially dry combusted output stream.

11. The method of claim 1 further comprising the step of compressing the combusted output stream and the dry combusted output stream to a pressure of from about 150 to about 2,000 psi.

12. The method of claim 1 further comprising the steps of:
    (i) providing a third reactor and a fourth reactor;
    (ii) repeating steps (b)-(e), but substituting the third reactor in place of the first reactor;
    (iii) repeating steps (f)-(i), but substituting the fourth reactor in place of the second reactor;
    (iv) allowing the oxygen carrier agent of the third reactor to become enriched with oxygen while allowing the oxygen carrier agent of the fourth reactor to become depleted with oxygen;
    (v) repeating steps (ii)-(iv) with the third reactor substituted in place of the fourth reactor and the fourth reactor substituted in place of the third reactor;
    (vi) repeating steps (ii)-(iv); and
    (vii) repeating steps (v) and (vi) a plurality of times.

13. The method of claim 1 wherein step (j) lasts for a duration of about 15 to about 30 minutes before commencing the next step after step (j).

14. The method of claim 1 wherein step (j) lasts for a duration of about 5 to about 8 hours before commencing the next step after step (j).

* * * * *